Jan. 2, 1951      C. F. COOKSON      2,536,872

REARVIEW AUTOMOBILE MIRROR

Filed May 22, 1950

INVENTOR
CLARENCE F. COOKSON,
BY
*Irving Seidman*
ATTORNEY

Patented Jan. 2, 1951

2,536,872

UNITED STATES PATENT OFFICE 2,536,872

REARVIEW AUTOMOBILE MIRROR

Clarence F. Cookson, Fairhaven, Mass.

Application May 22, 1950, Serial No. 163,383

3 Claims. (Cl. 88—87)

This invention relates to a rear view mirror for automobiles and has particular reference to a mirror of the said type wherein a multiplicity of mirrored panels are adjustably mounted upon a supporting rod which is pivotally bracketed upon the interior of a car in front of the operator and just below the ceiling of an automobile.

An object of the invention is to provide a rear view mirror of the character described wherein the mirrors are removably mounted in panels which are pivotally mounted upon brackets extending from and secured to a carrier which is in turn pivotally supported upon the interior front wall of an automobile.

A further object of this invention is to provide a rear view mirror of the character described wherein the mirrors are adapted to angular adjustment, about a vertical axis, with respect to the operator's line of vision so that the various mirrors reflect a rearward view to the operator's point of vision.

Another object of this invention is to provide, in a device of the character described, a carrier or mirror supporting bar which is pivotally attached within the car and affords a means for tilting the mirrors so that the lines of vision may be adjusted to the eye height of the operator.

A still further object of this invention is the provision, in a device of the character described, wherein vertically adjustable mirror carrying panels are provided with grooved edges within which mirrors engage, end plates and clips removably attached at one end of the mirror carrying panels and locking means upon the end plates and clips engageable with complementary locking means upon the panels to hold the mirrors in place.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawings, in which.

Figure 1:
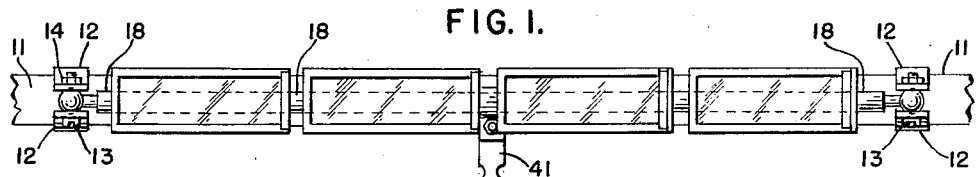
Fig. 1 is a front elevational view of a rear view mirror embodying the features of this invention.

Referring in detail to the parts, 11 designates a part of the bead moulding enclosing a windshield of an automobile and 12—12 are upper and lower, similar clamping elements having hooked ends 13 which engage over and embrace the bead moulding 11. (Shown by full lines in Figs. 1 and 2 and by dot-dash lines in Fig. 4.) A supporting member comprising a pair of similarly shaped clamping elements 12 are held together by means of bolts 13 and nuts 14. One end of each of said clamping elements is formed with a hook 15 which engages over and embraces the said bead moulding 11. The opposite or inner end of each clamping element 12 is formed with an orifice 16 within which ball shaped elements 17 engage. The said ball shaped elements 17 are formed upon the ends of a rod or carrier member 18 and with the engaging orificed ends of the clamping elements form a ball and socket joint thereby supporting the carrier rod 18 and permitting an oscillatory movement to same. By tightening the nuts 14 upon the bolts 13 the clamping members 12 may be brought together to secure the hooked ends 15 upon the bead moulding 11 and the orificed ends against the ball shaped end 17 of the carrier rod 18.

Figure 7:
Fig. 7 is a fragmentary detail of a part of the device.

Spaced at intervals along and upon the carrier rod 18 are ringed supporting members 19 having open lug ends 20 which are held together by means of bolts 21 and nuts 22 (Fig. 4) to securely hold the said ringed supporting members 19 in fixed position upon the carrier rod 18. Pivotally secured to the lugs 20 are mirror carrying frames comprising a back wall 23, side walls 24 along the two long sides and along one end of same, the said side and end walls having over-lapping flanges 25 forming a groove 26 within which a mirrored plate 27 is adapted to be held. Extending from the back wall 21 of each frame is a lug 28 which is pivotally held upon the lugs 20 of the ringed supporting members 19. One of the said lugs 28 may be attached to each mirror carrying frame by split end lugs 30 and 31 formed upon each of the lugs 20 (Figs. 4 and 7) which pass through an orifice 29 in each back wall 23 and are turned or bent against the inner surface of the back wall and welded or otherwise attached thereto.

Figure 3:
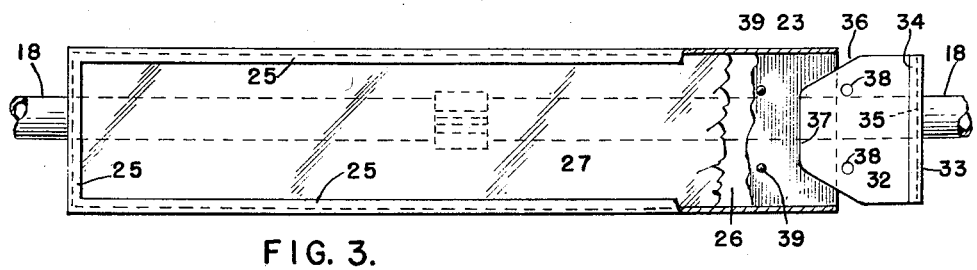
Fig. 3 is enlarged detail view of a part of the invention showing a portion of same in section and a part partially withdrawn therefrom.

The open end of each mirror carrying frame (see Figs. 3, 5 and 6) is provided with a removable end plate and clamping member 32 formed with an end wall 33 overlapping flange 34 and groove 35. The bottom or plate portion of the removable member 32 is beveled at its inner end as at 36 to form a narrowed end 37 which is adapted to be moved into the open end of the mirror carrying frame between the mirror 27 and back wall 23. Orifices 38 may be formed in the plate portion 32 which align with and engage button formations 39 in the back wall 23 and hold the removable end member in place when same is pushed into and closes against the contacting edge of the mirror member. The mirrors 27 may be backed with any suitable material 40 to act as a cushion to prevent rattling.

Figure 2:
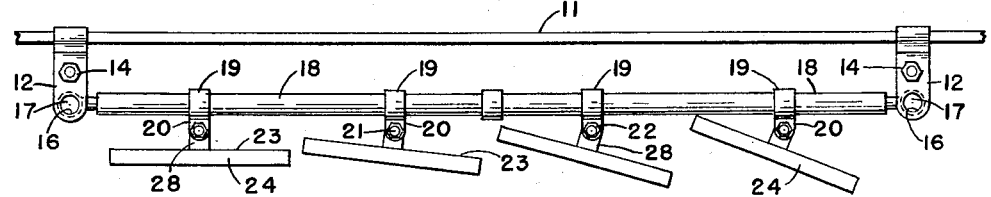
Fig. 2 is a top or plan view of same.
Figures 4, 5, 6:
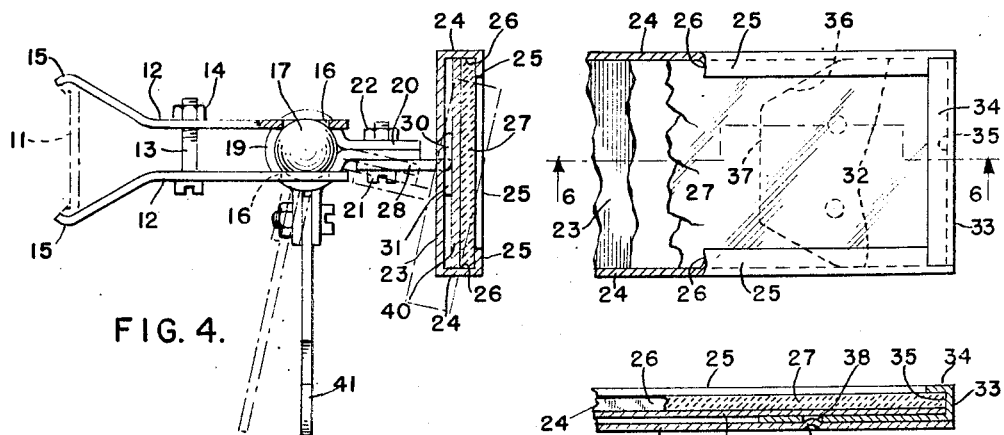
Fig. 4 is an enlarged end view of the device showing a portion in section and a part broken away.
Fig. 5 is an enlarged fragmentary detail showing the end portion of a part of the device.
Fig. 6 is a sectional elevation taken along the line 6—6 of Fig. 5.

It will be noted (Fig. 2) that the angular adjustment of the mirrors varies with respect to the longitudinal line of the supporting or carrier rod 18. This variation is essential to accomplish a clear rear view reflection to the eye of the operator and observer. So that the mirror holding frames may be readily swung into the position desired by the operator, the pivotal connections while tight, are free to be moved by hand pressure. In order to properly tilt the mirror frames about a horizontal axis to meet the requirement of the varying eye levels of various operators, the carrier rod 18 is provided with a handle 41 which is attached to the carrier rod 18, as shown in Figs. 1 and 4. The dot-dash lines in Fig. 4 show a tilting movement of the carrier rod and its supported mirror frames and mirrors.

I claim:

1. A rear view mirror means for automobiles comprising an elongated supporting rod disposed across the upper portion of a windshield and pivotally connected at its respective ends for adjustment about its horizontal axis, a plurality of mirror units disposed upon said supporting rod, ring-shaped supports mounted on the supporting rod, lugs extending laterally from the ring-shaped supports, lugs upon the rear wall of the mirror units engageable with the lugs upon the ring-shaped supports, and a nutted bolt engageable through the coacting lugs of the ring-shaped supports and the lugs upon the rear wall of the mirror units to permit individual adjustment of the mirror units about an axis at right angles to the axis of the supporting rod, whereby the angular adjustment of the mirror units may be varied with respect to the longitudinal axis of the supporting rod, said ring-shaped supports being rotatably movable about the axis of the supporting rod to permit adjustment of the mirror units on a horizontal axis.

2. A rear view mirror for automobiles as defined in claim 1, including a handle attached to said supporting rod to facilitate its horizontal pivotal movement.

3. A rear view mirror for automobiles as defined in claim 1, including attachment clamps comprising an upper and lower element having attachment clamping hooks at one end engageable with the bead moulding of an automobile windshield, the opposite ends of the said upper and lower elements pivotally engageable with said supporting rod, and a bolt engaging through the central portion of said upper and lower clamping elements to bring the ends of same tightly together.

CLARENCE F. COOKSON.

REFERENCES CITED

The following references are of record in the file of this patent:

UNITED STATES PATENTS

| Number | Name | Date |
|---|---|---|
| 1,069,160 | Meltz | Aug. 5, 1913 |
| 1,724,029 | La Hodny | Aug. 13, 1929 |
| 1,770,050 | Thompson | July 8, 1930 |
| 2,161,006 | Bixel et al. | June 6, 1930 |
| 2,413,894 | Sorenson | Jan. 7, 1947 |